Patented Feb. 6, 1923.

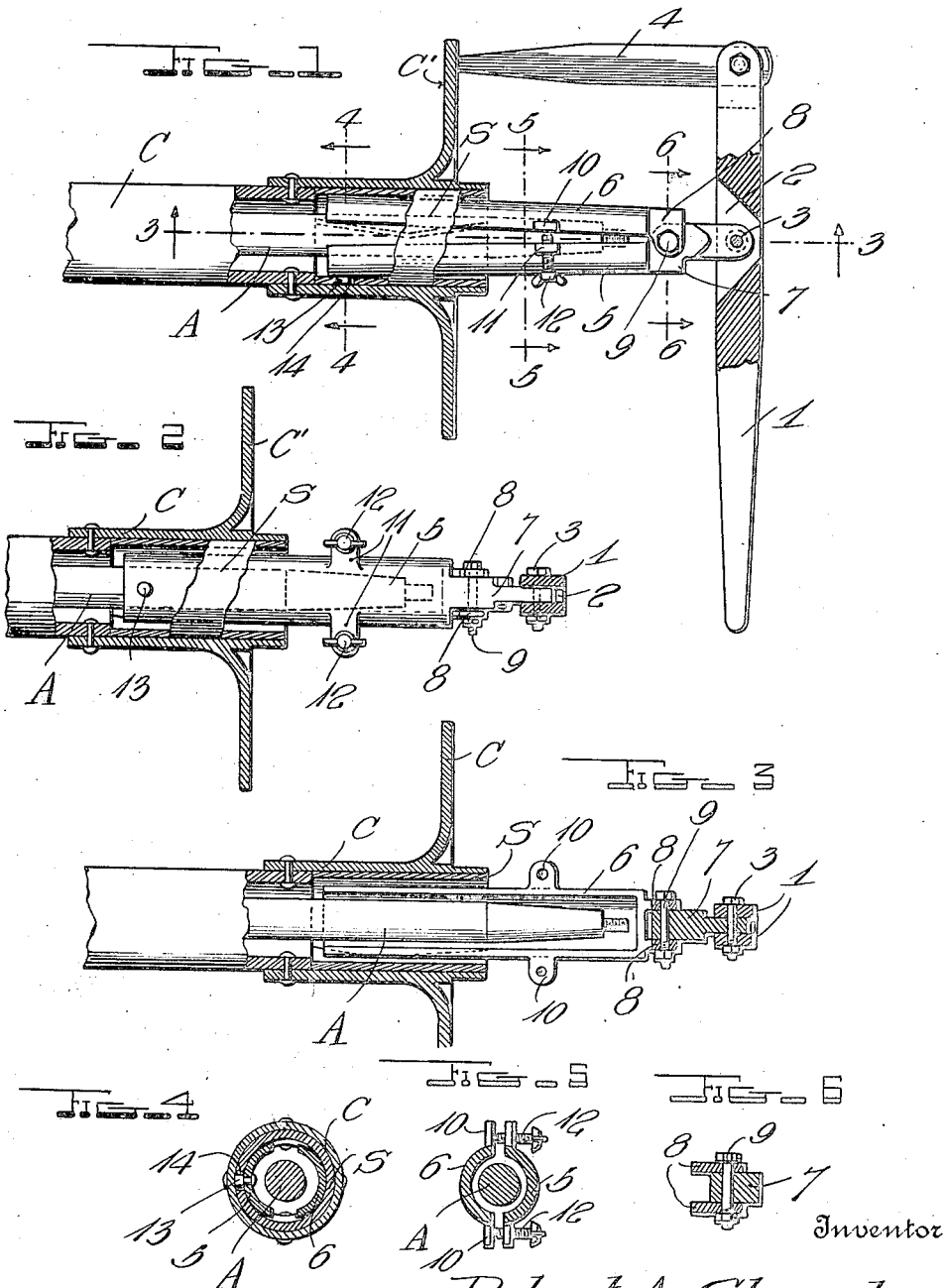

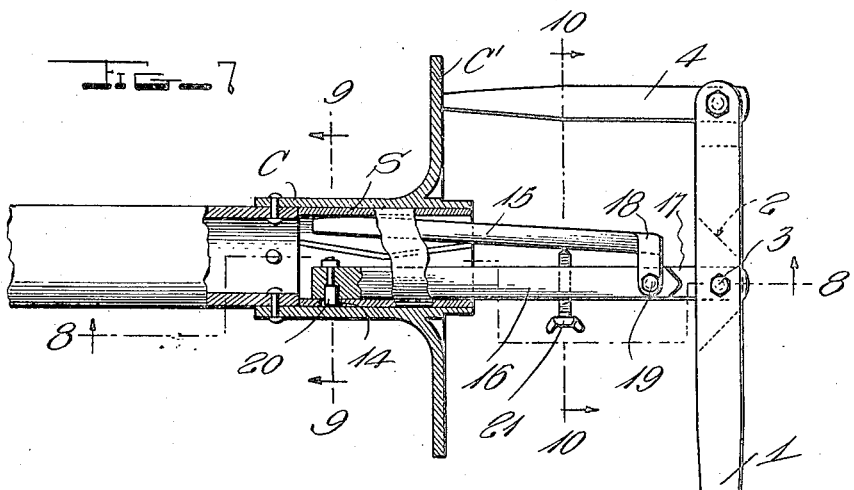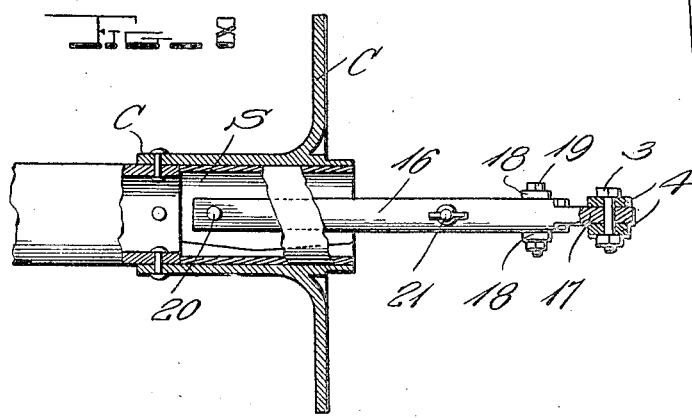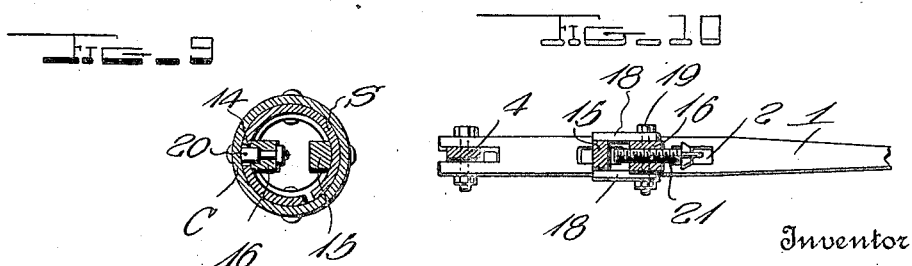

1,444,280

UNITED STATES PATENT OFFICE.

ROBERT A. SLOUGH, OF DAYTON, OHIO.

BEARING-SLEEVE PULLER.

Application filed January 16, 1922. Serial No. 529,585.

*To all whom it may concern:*

Be it known that I, ROBERT A. SLOUGH, a citizen of the United States, residing at Dayton, in the county of Montgomery and State of Ohio, have invented certain new and useful Improvements in Bearing-Sleeve Pullers; and I do declare the following to be a full, clear, and exact description of the invention, such as will enable others skilled in the art to which it appertains, to make and use the same.

This invention relates to an improved sleeve puller for use in removing a bearing sleeve from a rear axle housing and one object of the invention is to provide a sleeve remover having a lever and fulcrum member carried by the lever and improved sleeve-engaging means connected with the lever.

Another object of the invention is to so construct the sleeve-engaging element that it may be inserted in the sleeve to be extracted and then expanded by means externally of the sleeve to bring the portions of the sleeve-engaging element which are movable one with respect to the other, into tight engagement with the sleeve.

Another object of the invention is to so construct this sleeve-engaging element that it may be formed either as solid bars which are pivotally connected and movable toward and away from each other, or in the form of arcuate shell members which are pivotally connected for movement toward and away from each other and together form a shell for fitting within the sleeve to be removed and about an axle which extends through the sleeve.

Another object of the invention is to provide a sleeve puller having a comparatively few number of parts all of which will be of a very strong construction and not liable to break when placed under strain.

This invention is illustrated in the accompanying drawings, wherein:

Figure 1 is a view showing one form of the puller partially in top plan and partially in section, the puller being shown in use.

Figure 2 is a view showing the structure of Fig. 1 partially in longitudinal section and partially in side elevation.

Figure 3 is a sectional view taken along the line 3—3 of Fig. 1.

Figure 4 is a sectional view taken along the line 4—4 of Fig. 1.

Figure 5 is a sectional view taken along the line 5—5 of Fig. 1.

Figure 6 is a sectional view taken along the line 6—6 of Fig. 1.

Figure 7 is a view similar to Fig. 1 and showing a modified form of puller.

Figure 8 is a sectional view taken along the line 8—8 of Fig. 7.

Figures 9 and 10 are sectional views taken along the lines 9—9 and 10—10 respectively of Fig. 7.

This device is for removing a bearing sleeve S from an axle casing designated in general by the letter C, the axle casing being provided with an outstanding collar C' against which the fulcrum bar of the sleeve puller is to engage. The axle A extends through the axle casing and one form of the device is so constructed that it may be used with the axle extending through the casing whereas the modified form is constructed for use in connection with a casing from which the axle has been removed.

This sleeve removing device is provided with an operating lever 1 which is formed of metal and intermediate its length is provided with a transversely extending slot forming a pocket 2 in which the sleeve-engaging element is to be pivotally mounted by means of a pivot pin 3 which in the present illustration is a bolt. By having this pivot pin in the form of a bolt, the bolt can be removed and the specific type of sleeve-engaging means shown in Fig. 7 substituted for that shown in Fig. 1 when so desired. A stake or fulcrum element 4 is pivotally connected with one end of the lever 1 and is to engage the collar C' of the casing 3 so that the lever may be swung upon this stake and thus power exerted to draw the sleeve-engaging element and sleeve out of the axle casing. The sleeve-engaging element may be formed as shown in Figs. 1 through 6 or it may be formed as shown in Figs. 7 through 10.

In the form shown in Figs. 1 through 6, the sleeve-engaging element is formed as a shell for fitting about the axle A between the axle and the sleeve S. The two sections 5 and 6 which form this shell are arcuate in cross section as shown in Figs. 4 and 5 and one of them is provided at its upper end with a solid neck 7 and the other with arm extensions 8 which extend upon opposite sides of the neck 7 so that a bolt 9 may be passed through the side arms and neck 7 to pivotally connect the two sections of the sleeve-engaging element. The neck 7 extends into the socket 2 and the bolt 3 extends through this neck as shown in Fig. 1 and thus serves to pivotally connect the sleeve-engaging element with the lever. Side ears 10 extend from one of the sections of the sleeve-engaging element and the second section is provided with similar ears 11 which however are provided with threaded openings to receive set-screws 12. These set-screws 12 engage the ears 10 so that the sections may be forced apart when necessary. When the extractor is in place with the axle extending through the shell as shown, the set-screws 12 may be turned to engage the ears 10 and force the two sections of the sleeve-engaging element apart. When the two sections of the sleeve engager are forced apart, one will engage one side of the sleeve and the other will be moved to engage the opposite side portion of the sleeve as shown in Fig. 4 with the pin 13 which is carried by this section fitting into the opening 14 formed in the sleeve. Since the pin is firmly held in this opening, the sleeve will be drawn out of the axle casing when the sleeve-engaging element is drawn outwardly. Therefore when the lever is rocked upon its fulcrum and thus swung away from the axle casing, the sleeve-engaging element will be drawn outwardly and the sleeve will be drawn outwardly with it.

In the form shown in Figs. 7 through 10, the sleeve-engaging element is provided with two sections which are in the form of bars 15 and 16. The bar 16 is provided at its outer end with a neck extension 17 which fits into the pocket 2 of the lever and receives the pivot bolt 3 thus pivotally connecting the sleeve remover with the lever. The bar 15 is provided with side arms 18 which extend upon opposite sides of the bar 16 and are pivotally connected with the bar 16 by means of a pivot bolt 19. It will thus be seen that this bar 15 which corresponds to the section 5 of the form shown in Figs. 1 through 6 will be pivotally connected with the bar or section 16 which corresponds to the section 6 in the same manner that the section 5 is connected with the section 6. This bar 16 carries a pin 20 for fitting into the opening 14 of the sleeve in the same manner that the pin 13 fits into this opening. Instead of having the bar 16 provided with side ears in which set-screws are mounted and the bar 15 provided with side ears to be engaged by the set-screws, the bar 16 has been provided with a threaded opening through which a set-screw 21 passes. This set-screw 21 engages the bar 15 as clearly shown in Figs. 7 and 10 and it will be readily seen that when the set-screw is turned in the proper direction, it will engage the bar 15 and force it away from the bar 16. This form will be used as shown in Figs. 7 and 8 when a sleeve is to be removed from an axle casing from which the axle has already been removed. The operation of this form is the same as already described in connection with the form shown in Figs. 1 through 6.

There has thus been provided a sleeve remover which is so constructed that it may be used very effectively for removing a sleeve from an axle casing.

There has further been provided a sleeve puller for use in automobile repair work which is very simple in construction, quick to operate, very strong, and so constructed that it will not injure the bearing sleeve or housing when in use.

It is to be understood that the specific form shown and described is only one specific illustration of the invention and that changes of proportion and variations of specific structure may be made such as come within the scope of the appended claims.

I claim:

1. A bearing sleeve remover comprising an operating lever, a fulcrum bar pivotally connected with one end of said lever, and sleeve-engaging means comprising elongated gripping members pivotally connected and one being extended beyond the pivotal connection and pivotally connected with said lever intermediate the length thereof, and means for moving said members away from each other and into operative engagement with a sleeve.

2. A bearing sleeve remover comprising an operating lever, a fulcrum bar pivotally connected with one end of said lever, and sleeve-engaging means comprising elongated gripping members pivotally connected and one being extended beyond the pivotal connection and pivotally connected with said lever intermediate the length thereof, a pin extending from one member for fitting into an opening in a sleeve, and a set-screw for forcing said members apart.

3. A bearing sleeve remover comprising an operating lever, a fulcrum bar pivotally connected with one end of said lever, and sleeve-engaging means comprising elongated gripping members pivotally connected and one being extended beyond the pivotal connection and pivotally connected with said lever intermediate the length thereof, side ears extending from said members, and set screws passing through threaded openings in the ears of one member and engaging the ears of the other member for forcing the members away from each other.

4. The structure of claim 1 having the neck portion of one of the gripping members pivotally mounted in a pocket formed intermediate the length of the lever.

5. The structure of claim 1 having the neck portion of one of the gripping members pivotally mounted in a pocket formed intermediate the length of the lever, the second gripping member having side arms extending upon opposite sides of the neck and pivotally connected therewith.

6. The structure of claim 1 having the gripping members arcuate in cross section and forming a shell for fitting within a sleeve and about an axle extending through the sleeve.

In testimony whereof I have hereunto set my hand.

ROBERT A. SLOUGH.